United States Patent
Szor

(10) Patent No.: US 7,287,281 B1
(45) Date of Patent: Oct. 23, 2007

(54) SEND BLOCKING SYSTEM AND METHOD

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 906 days.

(21) Appl. No.: 10/464,091

(22) Filed: Jun. 17, 2003

(51) Int. Cl.
*H04L 9/00* (2006.01)

(52) U.S. Cl. .................. 726/25; 726/22; 726/23; 726/24; 713/165; 713/167; 713/188

(58) Field of Classification Search .............. None
See application file for complete search history.

(56) References Cited

U.S. PATENT DOCUMENTS

| | | | |
|---|---|---|---|
| 5,598,531 A | 1/1997 | Hill | 395/186 |
| 5,696,822 A | 12/1997 | Nachenberg | 380/4 |
| 5,802,178 A | 9/1998 | Holden et al. | 380/49 |
| 5,822,517 A | 10/1998 | Dotan | 395/186 |
| 6,199,181 B1 * | 3/2001 | Rechef et al. | 714/38 |
| 6,301,699 B1 | 10/2001 | Hollander et al. | 717/4 |
| 6,357,008 B1 | 3/2002 | Nachenberg | 713/200 |
| 6,658,571 B1 * | 12/2003 | O'Brien et al. | 726/26 |
| 6,718,414 B1 * | 4/2004 | Doggett | 710/267 |
| 6,910,142 B2 | 6/2005 | Cross et al. | 713/324 |
| 7,085,928 B1 * | 8/2006 | Schmid et al. | 713/164 |
| 7,146,305 B2 | 12/2006 | van der Made | |
| 7,181,603 B2 | 2/2007 | Rothrock et al. | |
| 2002/0083334 A1 | 6/2002 | Rogers et al. | |

OTHER PUBLICATIONS

Choi, Y., et al, 'A New Stack Buffer Overflow Hacking Defense Technique with Memory Address Confirmation', ICISC 2001: 4th International Conference Seoul, Korea, Dec. 6-7, 2001. Proceedings, pp. 146-159, http://www.springerlink.com/content/x8tn836pk6wyp8kw/fulltext.pdf.*

Xenitellis, S., 'Security Vulnerablilties in Event-Driven Systems', ISG, Royal Holloway Univ. of London, 2002, entire document, http://www.isg.rhul.ac.uk/~simos/pub/OLD/SecurityVulnerabilitiesInEvent-drivenSystems.pdf.*

Vasudevan, A., et al, 'Cobra: Fine-grained Malware Analysis using Stealth Localized-executions', 2006, Dept. of CS and Engineering, Univ. of TX, entire document, http://data.uta.edu/~ramesh/pubs/IEEE-Cobra.pdf.*

(Continued)

*Primary Examiner*—Nasser Moazzami
*Assistant Examiner*—Ronald Baum
(74) *Attorney, Agent, or Firm*—Gunnison, McKay & Hodgson, L.L.P.; Serge J. Hodgson

(57) ABSTRACT

A method includes hooking a send operating system function, originating a call to the send operating system function with a call module to send the content of a send buffer, stalling the call, and determining whether the call module or a copy of the call module are in the send buffer. Upon a determination that the call module or a copy of the call module are in the send buffer, the method further includes terminating the call. By terminating the call, the call module comprising malicious code is prevented from sending itself or a copy of itself to other host computer systems thus preventing the spread of the call module.

18 Claims, 5 Drawing Sheets

OTHER PUBLICATIONS

Finnegan, J., 'Pop Open a Privileged Set of APIs with Windows NT Kernel Mode Drivers', Microsoft Corp., Microsoft Systems Journal, Mar. 1998, entire article, http://www.microsoft.com/MSJ/0398/driver.aspx.*

Szor, P., U.S. Appl. No. 10/371,945, filed Feb. 21, 2003, entitled "Safe Memory Scanning".

Szor, P., U.S. Appl. No. 10/781,207, filed Feb. 17, 2004, entitled "Kernal Mode Overflow Attack Prevention System and Method".

Vasudevan et al., "SPiKE: Engineering Malware Analysis Tools using Unobtrusive Binary-Instrumentation", *Conferences in Research and Practice in Information Technology*, vol. 48, Australian Computer Society, Inc., Jan. 2006, pp. 1-10. Retrieved from the Internet on Dec. 1, 2006 from <URL:http://crpit.com/confpapers/CRPITV48Vasudevan.pdf>.

Szor, P., "*Attacks on WIN32*", Virus Bulletin Conference, Oct. 1998, Virus Bulletin Ltd., The Pentagon, Abingdon, Oxfordshire, England, pp. 57-84.

Szor, P., "*Memory Scanning Under Windows NT*", Virus Bulletin Conference, Sep. 1999, Virus Bulletin Ltd., The Pentagon, Abingdon, Oxfordshire, England, pp. 1-22.

Szor, P., "*Attacks on WIN32-Part II*", Virus Bulletin Conference, Sep. 2000, Virus Bulletin Ltd., The Pentagon, Abingdon, Oxfordshire, England, pp. 47-68.

Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd., The Pentagon, Abingdon, Oxfordshire, England, pp. 1-36.

Buysse, J., "*Virtual Memory: Window NT® Implementation*", pp. 1-15 [online]. Retrieved on Apr. 16, 2003. Retrieved from the Internet:<URL:http://people.msoe.edu/-barnicks/courses/cs384/papers19992000/buyssej-Term.pdf>.

Dabak, P., Borate, M. and Phadke, S., "*Hooking Windows NT System Services*", pp. 1-8 [online]. Retrieved on Apr. 16, 2003. Retrieved from the Internet :<URL:http://www.windowsitlibrary.com/Content/356/06/2.html>.

"*How Entercept Protects: System Call Interception*", pp. 1-2 [online]. Retrieved on Apr. 16, 2003. Retrieved from the Internet :<URL:http://www.entercept.com/products/technology/kernelmode.asp>. No author provided.

"*How Entercept Protects: System Call Interception*", p. 1 [online]. Retrieved on Apr. 16, 2003. Retrieved from the Internet :<URL:http://www.entercept.com/products/technology/interception.asp>. No author provided.

Kath, R., "*The Virtual-Memory Manager in Windows NT*", pp. 1-11 [online]. Retrieved on Apr. 16, 2003. Retrieved from the Internet:<URL:http://msdn.microsoft.com/library/en-us/dngenlib/html/msdn_ntvmm.asp?frame=true>.

Szor, P. and Kaspersky, E., "*The Evolution of 32-Bit Windows Viruses*", Windows & .NET Magazine, pp. 1-4 [online]. Retrieved on Apr. 16, 2003. Retrieved from the Internet:<URL:http://www.winnetmag.com/Articles/Print.cfm?ArticleID=8773>.

Szor, P., "*The New 32-bit Medusa*", Virus Bulletin, Dec. 2000, Virus Bulletin Ltd., The Pentagon, Abingdon, Oxfordshire, England, pp. 8-10.

Szor, P., "*Shelling Out*", Virus Bulletin, Feb. 1997, Virus Bulletin Ltd., The Pentagon, Abingdon, Oxfordshire, England, pp. 6-7.

McCorkendale, B. and Szor, P., "*Code Red Buffer Overflow*", Virus Bulletin, Sep. 2001, Virus Bulletin Ltd., The Pentagon, Abingdon, Oxfordshire, England, pp. 4-5.

Nachenberg, C., "*A New Technique for Detecting Polymorphic Computer Viruses*", University of California, Los Angeles, 1995.

"*INFO: CreateFileMapping ( ) SEC ★ Flags*", pp. 1-2 [online]. Retrieved on Sep. 24, 2003. Retrieved from the Internet: <URL:http://support.Microsoft.com/default.aspx?scid=http://support.Microsoft.com:80/support/kb/articles/Q108/2/31.asp&NoWebContent=1> No author provided.

"*CreateFileMapping*", pp. 1-5 [online]. Retrieved on Sep. 10, 2003. Retrieved from the Internet: <URL:http://msdn.Microsoft.com/library/en-us/fileio/base/createfilemapping.asp?frame=true> No author provided.

* cited by examiner

SEND BLOCKING SYSTEM AND METHOD

BACKGROUND OF THE INVENTION

1. Field of the Invention

The present invention relates to the protection of computer systems. More particularly, the present invention relates to a behavior-blocking system and method.

2. Description of the Related Art

Buffer overflow techniques have been used by malicious hackers and virus writers to attack computer systems. Buffers are data storage areas, which generally hold a predefined amount of finite data. A buffer overflow occurs when a program attempts to store data into the buffer, where the data is larger than the size of the buffer.

One category of buffer overflow, sometimes called stack-based buffer overflow, involves overwriting stack memory. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions. Thus, by exploiting a buffer overflow, it is possible to inject malicious code into the execution flow. This gives unauthorized access to not only malicious hackers, but also to replicating malware, e.g., worms.

SUMMARY OF THE INVENTION

A method includes hooking a send operating system function, originating a call to the send operating system function with a call module to send the content of a send buffer, stalling the call, and determining whether the code of the call module is in the send buffer. Upon a determination that the code of the call module is in the send buffer, i.e., that the call module is attempting to send itself or a copy of itself, the method further includes terminating the call. By terminating the call, spreading of the call module to other host computer systems is prevented.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 2:
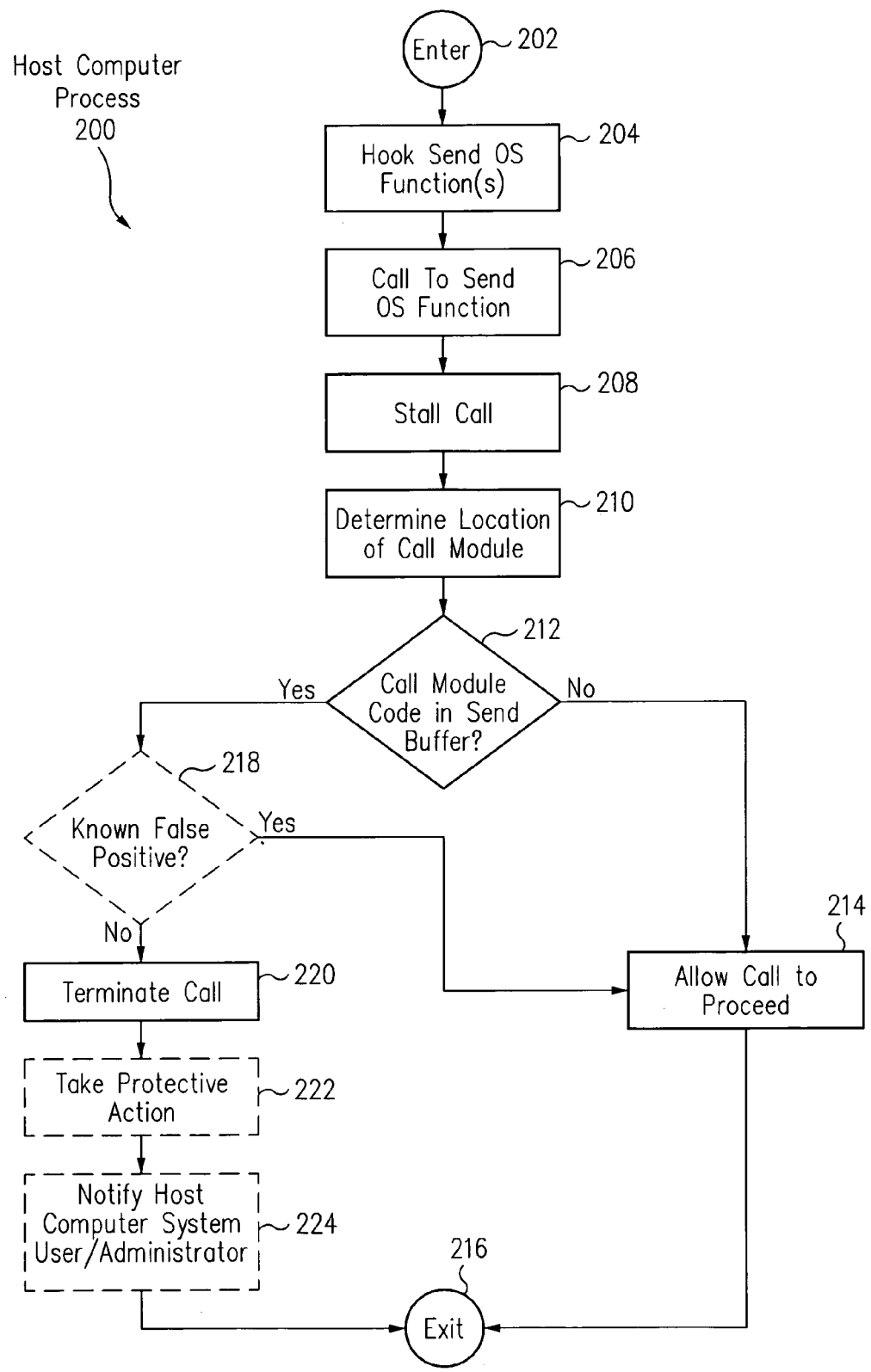
FIG. 2 is a flow diagram of a host computer process in accordance with one embodiment of the present invention.
Figure 3:
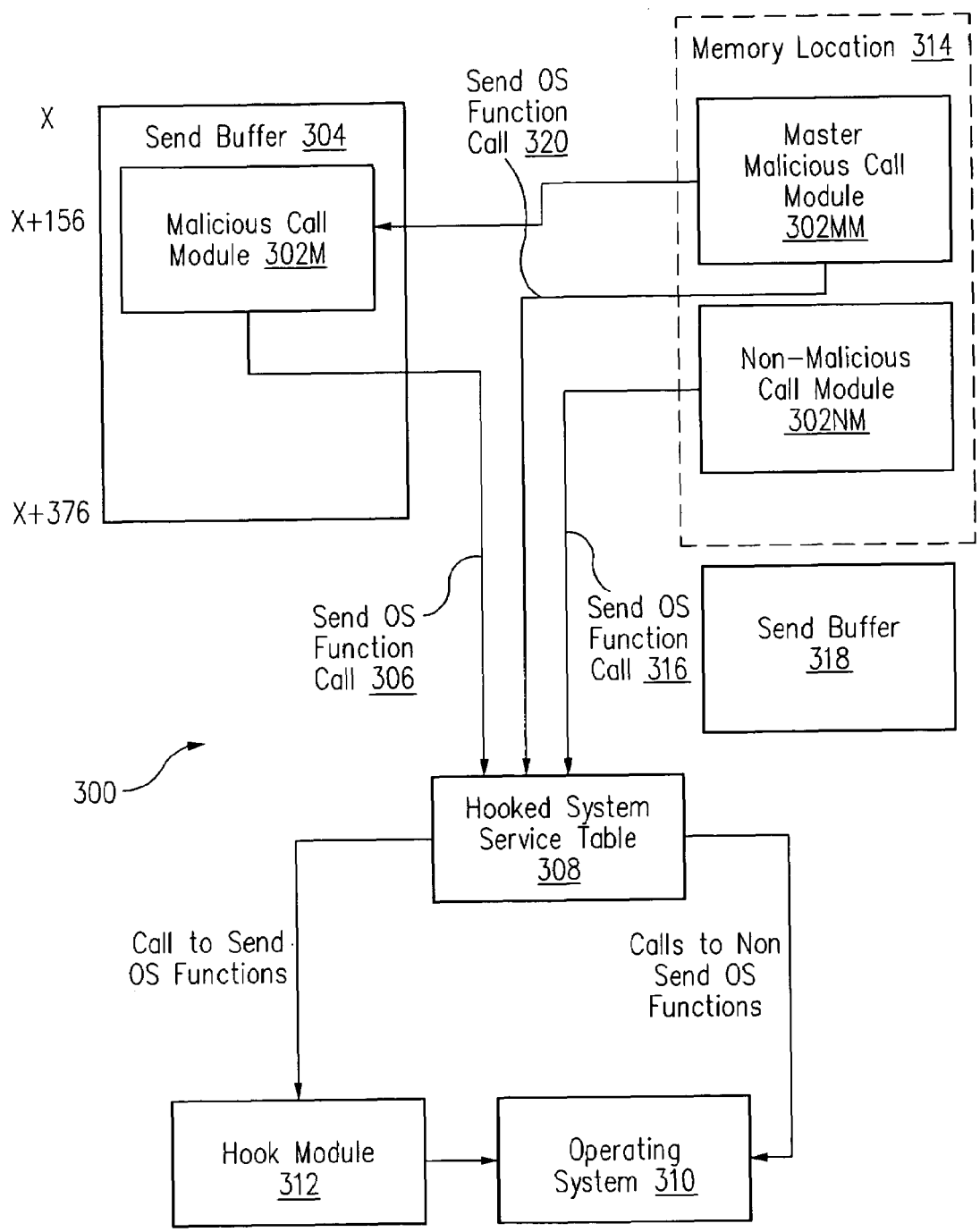
FIG. 3 is a diagram of a hooked operating system function call flow in accordance with one embodiment of the present invention.

In accordance with one embodiment of the present invention, referring to FIGS. 2 and 3 together, a method includes hooking a send operating system function (operation 204), originating a send OS function call 306 to the send operating system function (operation 206) with a malicious call module 302M to send the content of a send buffer 304, stalling send OS function call 306 (operation 208), determining a location of malicious call module 302M (operation 210), and determining whether the code of malicious call module 302M is in send buffer 304 (check operation 212). Upon a determination that the code of malicious call module 302M is in send buffer 304, i.e., that malicious call module 302M is attempting to send itself, the method further includes terminating send OS function call 306. By terminating send OS function call 306, spreading of malicious call module 302M to other host computer systems is prevented.

Figure 1:
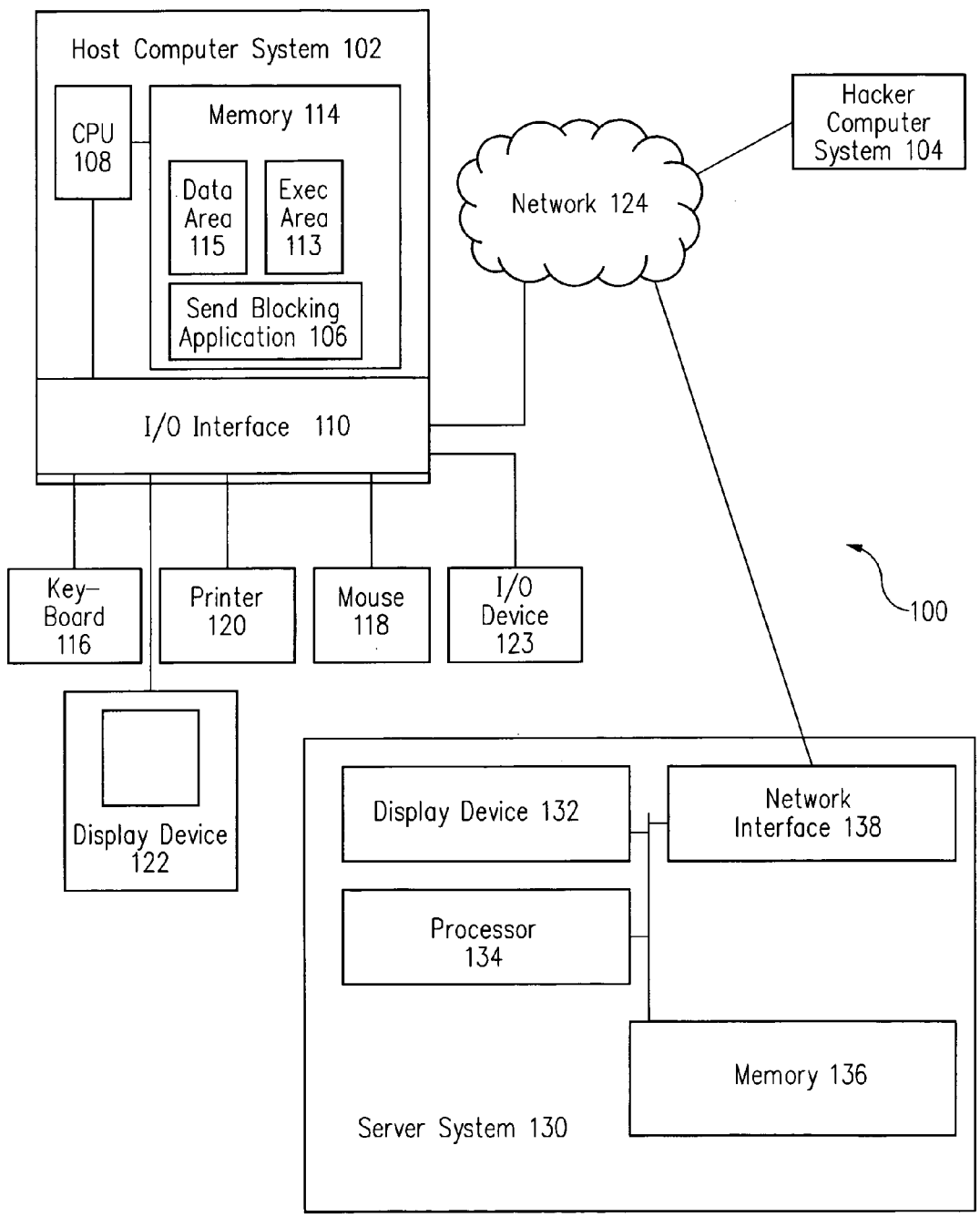
FIG. 1 is a diagram of a client-server system that includes a send blocking application executing on a host computer system in accordance with one embodiment of the present invention.

More particularly, FIG. 1 is a diagram of a client-server system 100 that includes a send blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output. (I/O) devices 123, such as a compact disk (CD) or DVD drive, floppy disk drive, or other digital or waveform port for inputting data to and outputting data from host computer system 102. In one embodiment, send blocking application 106 is loaded into host computer system 102 via I/O device 123, such as from a CD, DVD or floppy disk containing send blocking application 106.

In one embodiment, memory 114 includes an executable area 113 and a data area 115. Executable area 113 is an area of memory 114 in which executable applications are located.

In one embodiment, memory 114 includes a page based virtual memory system that uses pages, e.g., 4096 byte memory areas. These pages have individual properties such as, for example, that they are writable and/or executable. A page is writable if it is marked as writable, i.e., is marked as a page for storage of data. A page is executable if it is marked as executable, i.e., is marked as a page for storing executable content. In accordance with this embodiment, executable area 113 includes pages that are marked as executable. For example,. executable area 113 includes pages that are marked as executable and writable.

In one embodiment, a set of flags describe the properties of a page. For example, these flags are maintained in the page tables or in other operating system managed lists or databases.

In contrast, data area 115 is an area of memory 114 in which executable applications are not located, e.g., data area 115 is an area of memory 114 in which data is located. Examples of data area 115 include the stack, heap, and pages that are not marked as executable, i.e., non-executable pages.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, host computer system 102 is also coupled to one or more other host computer systems 102 (not shown) similar to host computer system 102 of client-server system 100 by network 124.

In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principals of the invention.

Network 124 can be any network or network system that is of interest to a user. In various embodiments, network interface 138 and I/O interface 110 include analog modems, digital modems, or a network interface card.

Send blocking application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a host computer process 200 in accordance with one embodiment of the present invention. Referring now to FIGS. 1 and 2 together, execution of send blocking application 106 by processor 108 results in the operations of host computer process 200 as described below in one embodiment.

From an enter operation 202, flow moves to a hook send operating system (OS) function(s) operation 204. In hook send OS function(s) operation 204, send OS functions, e.g., at least one send OS function, sometimes called an API, of host computer system 102 are hooked. In one embodiment, a system level, e.g., a kernel mode module or kernel mode driver, hooks the send OS functions. Further, in one embodiment, a send OS function is hooked by redirecting calls to the send OS function, for example, to a hook module in accordance with the present invention.

In one embodiment, a send OS function is an operating system function responsible for sending information located in a send buffer in host computer system 102 to another location, e.g., another network location or socket. Illustratively, WS2_32!send() and WS32!sendto() are examples of send OS functions although other send OS functions operations such as WINSOCK library APIs are used in other embodiments depending upon the configuration of the particular host computer system 102. Further, a send buffer is a memory area, e.g., of virtual memory and memory 114.

In accordance with one embodiment on a WINDOWS® system, a send function sends data on a connected socket:
  int send(
    SOCKET s,
    const char FAR *buf,
    int lens,
    int flags
  );
  where,
  s
    [in] Descriptor identifying a connected socket.
  buf
    [in] Buffer containing the data to be transmitted.
  len
    [in] Length of the data in buf.
  Flags
    [in] Indicator specifying the way in which the call is made.

As is well known to those of skill in the art, system calls expose all kernel functionality that user-mode programs require. User-mode programs need to utilize the functionality provided by the kernel, for example, to access disk drives, network connections, and shared memory. More particularly, because the processor prevents direct access to kernel mode functions by user-mode programs, user-mode programs use system calls, which form the only permitted interface between user-mode and kernel mode. In accordance with one embodiment, system calls include send OS function calls and non-send OS function calls.

From hook send OS function(s) operation 204, flow moves to a call to send OS function operation 206. In call to send OS function operation 206, a call, sometimes called a send OS, function call, to a send OS function is made by a call module of a parent application. The parent application may be malicious or non-malicious. More particularly, a send OS function call is made by a call module of a parent application to an OS function that was hooked in hook send OS function(s) operation 204.

In accordance with one embodiment of the present invention, a call module includes the send OS function call instruction(s), i.e., the instruction or set of instructions that originates the send OS function call. The call module may be malicious or non-malicious. The parent application includes the call module, or, in one embodiment, the parent application is the call module.

From call to send OS function operation 206, flow moves to a stall call operation 208. In stall call operation 208, the send OS function call of operation 206 to the send OS function is stalled, i.e., is prevented from reaching the operating system. By stalling the send OS function call, execution of the send OS function is stalled.

From stall call operation 208, flow moves to a determine location of call module operation 210. In determine location of call module operation 210, the location in memory 114 of the call module that originated the send OS function call of operation 206 to the send OS function is determined.

In one embodiment, a stack trace-back operation, e.g., a stack analyzer routine, is used to determine the location in memory 114 of the call module as discussed below with reference to FIG. 4.

From determine location of call module operation 210, flow moves to a call module code in send buffer check operation 212. In check operation 212, a determination is made as to whether the code of the call module, i.e., the call module itself or a copy of the call module, is in the send buffer, i.e., is in the area of memory 114 in which the information to be sent by the send OS function is located. If a determination is made in check operation 212 that the call module code is not in the send buffer, flow moves to an allow call to proceed operation 214.

In allow call to proceed operation 214, the send OS function call is allowed to proceed. More particularly, the send OS function call is passed to the operating system. As discussed above, the send OS function call was stalled in stall call operation 208. From allow call to proceed operation 214, flow moves to and exits at an exit operation 216 or returns to operation 206 and waits for the next send OS function call.

In one embodiment, because the code of the call module that originated the send OS function call is determined not to be in the send buffer in check operation 212, the likelihood that the call module is malicious code, e.g., is a self-replicating worm or other malicious code, is minimal. In one embodiment, malicious code is defined as any computer program, module, set of modules, or code that enters a computer system without an authorized use's knowledge and/or without an authorized user's consent.

However, if a determination is made in check operation 212 that the call module code is in the send buffer, i.e., that the call module is attempting to send itself or a copy of itself, the likelihood that the call module is malicious code is significant. Thus, if a determination is made in check operation 212 that the call module code is in the send buffer, flow moves to, optionally, a known false positive check operation 218.

In known false positive check operation 218, a determination is made as to whether the call, module, which has been-determined to have its code in the send buffer in check operation 212, is a known false positive call module. In one embodiment, a known false positive call module is a call module that has its code in the send buffer, i.e., is sending itself or a copy of itself, but that is, in fact, safe, i.e., does not contain malicious code. Known false positive check operation 218 is optional and in one embodiment is not performed.

If a determination is made that the call module is a known false positive call module, flow moves from known false positive check operation 218 to allow call to proceed operation 214, which is performed as discussed above.

Conversely, if a determination is made that the call module is not a known false positive call module in known false positive check operation 218, flow moves to a terminate call operation 220.

In terminate call operation 220, the send OS function call is terminated. More particularly, the send OS function call is not passed to the operating system but is terminated. As discussed above, the send OS function call was stalled in stall call operation 208.

In one embodiment, because the call module or a copy of the call module that originated the send OS function call is determined to be in the send buffer in check operation 212, the likelihood that the call module is malicious code is significant. However, by terminating the send OS function call in terminate call operation 220, the call module is prevented from sending itself or a copy of itself and thus prevented from spreading to other host computer systems.

From terminate call operation 220, optionally, flow moves to a take protective action operation 222. In take protective action operation 222, the parent application including the call module is terminated or other protective action is taken to protect host computer system 102, e.g., the thread that attempted the suspicious action is frozen. Termination of applications is well known to those of skill in the art and so is not discussed further for clarity of discussion.

Flow moves from take protective action operation 222, optionally, to a notify host computer system user/administrator operation 224. In notify host computer system user/administrator operation 224, the user of host computer system 102 and/or the administrator are notified that a call and, optionally if operation 222 is performed, a parent application, has been terminated on host computer system 102 or other protective action taken. The user and/or administrator can be notified using any one of a number of techniques, e.g., by using a pop up window, by writing to a file and/or otherwise by logging the event.

In one embodiment, the call module is identified as known malicious code or unknown malicious code. If the call module is unknown malicious code, the user and/or the administrator are asked to submit a sample of the unknown malicious code to a virus collection center for further analysis. In this manner, unknown malicious code such as CodeRed and Slammer kind of computer worms is detected and samples of the unknown malicious code are collected.

From notify host computer system user/administrator operation 224, flow moves to and exits at exit operation 216 or returns to operation 206 and waits for the next send OS function call.

FIG. 3 is a diagram of a hooked operating system function call flow 300 in accordance with one embodiment of the present invention. Although FIG. 3 describes one example of a hooked operating system function call flow, in light of this disclosure, those of skill in the art will understand that other techniques can be used to hook operating system function (s). The particular technique used depends, for example, on the particular operating system.

Referring now to FIG. 3, by exploiting a buffer overflow as an example, a malicious call module 302M containing malicious code, e.g., self-replicating malicious code such as a worm, is loaded into a send buffer 304. Generally, send buffer 304 is a memory area, e.g., an area of virtual memory. For example, a buffer overflow is exploited from hacker computer system 104 (FIG. 1).

Exploitation of buffer overflows is well known to those of skill in the art and so is not discussed to avoid detracting from the principals of the invention. For example, in "Blended Attacks. Exploits, Vulnerabilities and Buffer-Overflow Techniques in Computer Viruses," Chien, E. and Ször, P., Virus Bulletin Conference, 2002, Virus Bulletin Ltd, pp. 1-35, herein incorporated in its entirety by reference, the Applicant as co-author describes exploitation of buffer overflows.

Figure 4:
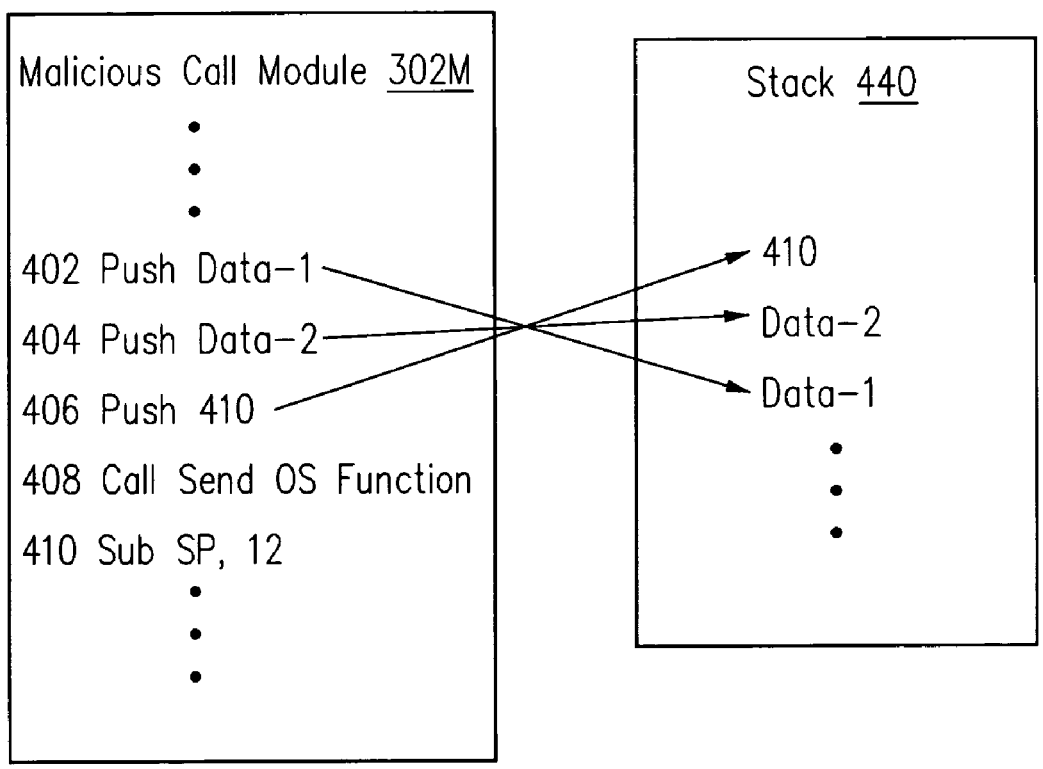
FIG. 4 is a pseudocode representation of a stack for use in determining the location of a call module in accordance with one embodiment of the present invention.

FIG. 4 is a pseudocode representation of a stack 440 used to determine the location of malicious call module 302M in accordance with one embodiment of the present invention. Referring now to FIGS. 2, 3 and 4 together, malicious call module 302M includes instructions 402, 404 and 406 that push Data-1, Data-2 and return pointer 410, respectively, on to stack 440. Malicious call module 302M further includes an instruction 408 that calls a send OS function and an instruction 410 that decrements the stack pointer for cleanup of stack 440 as those of skill in the art will understand.

Execution of instructions 402, 404 and 406 push Data-1, Data-2 and return pointer 410, respectively, on to stack 440 as shown by the arrows. Execution of instruction 408 causes send OS function call 306 to be made. More particularly, during execution of malicious call module 302M and performance of call to send OS function operation 206, malicious call module 302M originates send OS function call 306 to a send OS function to send the content of send buffer 304.

In one embodiment, malicious call module 302M originates. send OS function call 306 by making send OS function call 306 directly. In another embodiment,. malicious call module 302M originates send OS function call 306 by calling another function, e.g., a subroutine, which, in turn, makes send OS function call. 306.

Send OS function call 306 is routed to a hooked system servicetable 308. Hooked system service table 308 routes non-send OS function calls directly to an operating system 310. However, hooked system service table 308 routes send OS function calls to a hook module 312, e.g., a kernel mode module or kernel mode driver.

As is well known to those of skill in the art, a system service table, sometimes called a dispatch table or a system call table, relates system calls to specific addresses within the operating system kernel. Hooked system service table 308 in accordance with one embodiment of the present invention, redirects send OS function calls to hook module 312 and from the specific addresses within the operating system kernel to which the send OS function calls would otherwise be directed.

In one embodiment, hook module 312 is used to stall a send OS function call during stall call operation 208 of FIG. 2. Further, hook module 312 continues to stall the send OS function call during operations 210, 212 (and sometimes operation 218). Hook module 312 allows the send OS function call to proceed to operating system 310 during allow call to proceed operation 214. Conversely, hook module 312 terminates the send OS function call during terminate call operation 220.

In accordance with this embodiment, send OS function call 306 is routed by hooked system service table 308 to hook module 312. Send OS function call 306 is stalled by hook module 312 in stall call operation 208.

A determination is made that the location of malicious call module 302M is in send buffer 304 in determine location of call module operation 210. More particularly, in one embodiment, determine location of call module operation 210 is performed by analyzing the content of stack 440. Generally, return pointer 410 points to the location in memory 114 (FIG. 1) in which malicious call module 302M is located.

In accordance with this embodiment, the content of stack 440 is analyzed to locate return pointer 410, which points to malicious call module 302M. For purposes of illustration, assume that return pointer 410 is the value X+156. Thus, malicious call module 302M is determined to be located at memory location X+156 as illustrated in FIG. 3 in determine location of call module operation 210. Memory location X+156 is sometimes called the Caller's Address (CA) of malicious call module 302M.

Although FIG. 4 describes one example of pseudocode representation of a stack 440 used to determine the location in memory 114 of malicious call module 302M, in light of this disclosure, those of skill in the art will understand that other techniques and stack tracing functions can be used to determine the location of a call module that originated a send OS function call. The particular technique used depends, for example, on the particular operating system.

For example, in a user mode implementation on an Intel platform, the DWORD located at [ebp+4] is located. This points to the location of the call send OS function and is called the Caller's Address (CA). In one embodiment, the Caller's Address is an address located in the malicious code, e.g., in the worm's code.

From determine location of call module operation 210, flows moves to call module code in send buffer check operation 212, which is performed as discussed below in reference to FIG. 5.

Figure 5:
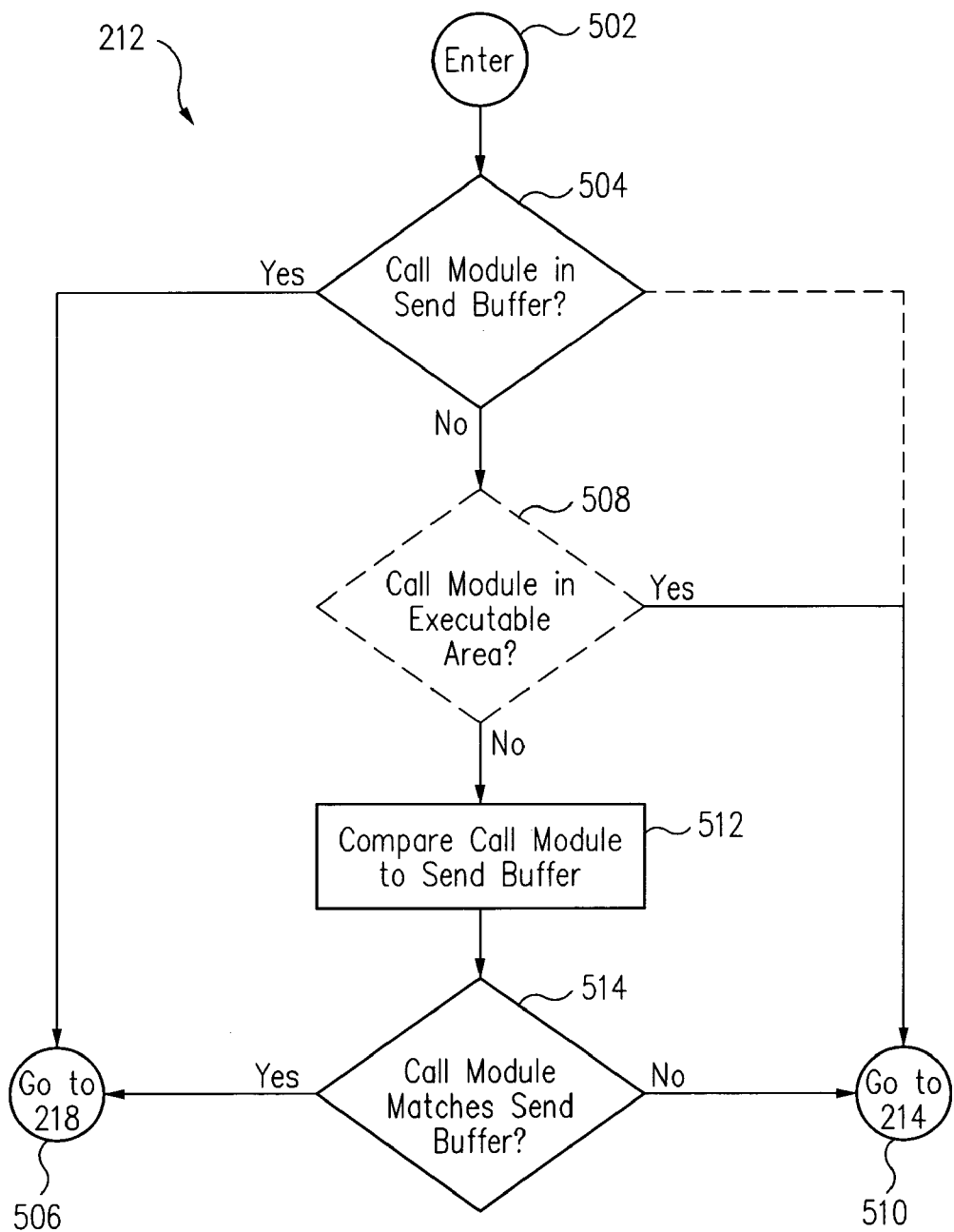
FIG. 5 is a flow diagram of a call module code in send buffer check operation of the host computer process of FIG. 2 in accordance with one embodiment of the present invention.

FIG. 5 is a flow diagram of call module code in send buffer check operation 212 of host computer process 200 of FIG. 2 in accordance with one embodiment of the present invention. Referring now to FIGS. 3, 4 and 5 together, from an enter operation 502, flow moves to a call module in send buffer check operation 504.

In call module in send buffer check operation 504, a determination is made as to whether the call module is located within the send buffer. If a determination is made that the call module is located within the send buffer, flow moves to operation 506 and returns to known false positive check operation 218 of FIG. 2. Conversely, if a determination is made that the call module is not located within the send buffer, flow moves to a call module in executable area check operation 508.

In one embodiment, in call module in send buffer check operation 504, the starting memory location and ending memory location of the send buffer in memory is determined. A determination is made as to whether the location of the call module is between the starting memory location and ending memory location of the send buffer.

In one embodiment, the send buffer is identified by analyzing the parameters pushed on the stack associated with the send OS function call. Illustratively, these parameters include the starting memory location of the send buffer in memory and the length of the data to be sent.

For example, referring to FIGS. 3 and 4 together, malicious call module 302M originates send OS function call 306 to send the content of send buffer 304. In accordance with this example, the starting memory location of send buffer 304 in memory is the parameter Data-1 and the length of the data to be sent is the parameter Data-2.

For purposes of illustration, assume parameter Data-1 equals the value X and the parameter Data-2 equals the value 376. Accordingly, send buffer 304 has a starting memory location X and an ending memory location X+376, i.e., send buffer 304 is the area of memory 114 (FIG. 1) that extends from starting memory location X to ending memory location X+376 and includes the starting memory location X.

If the location of the call module is between the starting memory location and ending memory location of the send buffer, a determination is made that the call module is located within the send buffer. Conversely, if the location of the call module is not between the starting memory location and ending memory location of the send buffer, a determination is made that the call module is not located within the send buffer.

More particularly, a determination is made that the call module is in the send buffer during call module in send buffer check operation 504 if the following relationship is true:

$$Buf<=CA<(Buf+Len) \qquad (1),$$

Where Buf is the starting memory location of the send buffer, CA is a memory location within the call module, and Len is the length of the data to be sent.

To continue with the above illustration, the caller's address (CA) of malicious call module 302M is determined to be X+156 by analyzing the content of stack 440, for example, with a stack trace function as discussed above.

Because relationship one is true as set forth by:

$$X<=(X+156)<(X+376),$$

a determination is made that malicious call module 302M is in send buffer 304 in call module in send buffer check operation 504, and flow returns to known false positive check operation 218 via operation 506.

After a determination that call module 302M is not a known false positive call module in known false positive check operation 218, hook module 312 terminates send OS function call 306 in terminate call operation 220. By terminating send OS function call 306, sending of the content of send buffer 304 including malicious call module 302M to another host computer system is prevented. Optionally, operations 222 and 224 are performed as discussed above and flow exits at exit operation 216 or returns to operation 206.

In contrast, a non-malicious call module 302NM, i.e., which does not include malicious code, is loaded into a memory location 314 of memory 114 (FIG. 1) and executed. During execution of non-malicious call module 302NM and performance of call to send OS function operation 206, non-malicious call module 302NM originates a send OS function call 316 to a send OS function to send the content of a send buffer 318. More particularly, non-malicious call module 302NM originates a send OS function call 316 to a send OS function to send content other than the content within memory location 314.

Send OS function call 316 is routed to hooked system service table 308. Send OS function call 316 is routed by hooked system service table 308 to hook module 312. Send OS function call 316 is stalled by hook module 312 in stall call operation 208. A determination is made that the location of non-malicious call module 302NM is not in send buffer 318, i.e., is in memory location 314, in determine location of call module operation 210, for example, using a stack trace-back in a manner similar to that discussed above in reference to FIG. 4.

Flow moves to call module code in send buffer check operation 212 and thus to call module in send buffer check operation 504. In call module in send buffer check operation 504, a determination is made that non-malicious call module 302NM is not in send buffer 318. More particularly, the starting memory location and ending memory location of send buffer 318 are determined. A determination is made that memory location 314 in not between the starting memory location and ending memory location of send buffer 318 and thus that non-malicious call module 302NM is not in send buffer 318. Accordingly, flow moves to call module in executable area check operation 508.

In call module in executable area check operation 508, a determination is made as to whether the call module is in an executable area of memory, e.g., in executable area 113 of memory 114 (FIG. 1). If the call module is in an executable area, flow moves to operation 510 and returns to allow call to proceed operation 214 of FIG. 2. Conversely, if a determination is made that the call module is not in an executable area, e.g., is in a data area such as the stack or heap, for example, is in data area 115 of memory 114 (FIG. 1), flow moves to a compare call module to send buffer operation 512.

Accordingly, if memory location 314 is in executable area 113, flow moves to allow call to proceed operation 214 and hook module 312 thus allows send OS function call 316 to proceed. Accordingly, send OS function call 316 is routed from hook module 312 to operating system 310. Operating system 310 causes sending of the content of send buffer 318, for example, to another host computer system.

However, if memory location 314 is not in executable area 113, flow moves to a compare call module to send buffer operation 512. In compare call module to send buffer operation 512, the call module is compared to the content of the send buffer, e.g., for similarities. For example, the bytes in the send buffer are compared to the code of the call module.

Accordingly, if memory location 314 is not in executable area 113, non-malicious call module 302NM is compared to the content of send buffer 318 for similarities.

Flow moves from compare call module to send buffer operation 512 to a call module matches send buffer check operation 514. In call module matches send buffer check operation 514, a determination is made as to whether the call module matches the content of the send buffer. If the call module does not match the content of the send buffer, flow moves to operation 510 and returns to allow call to proceed operation 214 of FIG. 2. Conversely, if the call module does match the content of the send buffer, flow moves to operation 506 and returns to known false positive check operation 218 of FIG. 2.

Because non-malicious call module 302NM is not attempting to send a copy of itself, a determination is made that non-malicious call module 302NM does not match the content of send buffer 318 in call module matches send buffer check operation 514 and flow moves to operation 510 and returns to allow call to proceed operation 214 of FIG. 2.

In accordance with one embodiment, referring now to FIG. 5, operations 508, 512, and 514 are not performed. In accordance with this embodiment, upon a determination that the call module is not in the send buffer in call module in send buffer check operation 504, flow moves directly to operation 510 and returns to allow call to proceed operation 214 of FIG. 2 as indicated by the dashed line.

Further, call module in executable area check operation 508 is optional and in one embodiment is not-performed. In accordance with this embodiment, upon a determination that the call module is not in the send buffer in call module in send buffer check operation 504, flow moves directly to compare call module to send buffer operation 512.

Referring again to FIGS. 2, 3 and 5 together, a master malicious call module 302MM, i.e., which does include malicious code, is loaded into memory location 314 of memory 114 (FIG. 1) and executed. Further, master malicious call module 302MM loads a copy of itself into send buffer 304, the copy being malicious call module 302M.

During execution of master malicious call module 302MM and performance of call to send OS function operation 206, master malicious call module 302MM originates a send OS function call 320 to a send OS function to send the content of send buffer 304, which includes malicious call module 302M.

Send OS function call 320 is routed to hooked system service table 308. Send OS function call 320 is routed by hooked system service table 308 to hook module 312. Send OS function call 320 is stalled by hook module 312 in stall call operation 208. A determination is made that the location of master malicious call module 302MM is not in send buffer 304, i.e., is in memory location 314, in determine location of call module operation 210, for example, using a stack trace-back in a manner similar to that discussed above in reference to FIG. 4.

Flow moves to call module code in send buffer check operation 212 and thus to call module in send buffer check operation 504. In call module in send buffer check operation 504, a determination is made that master malicious call module 302MM is not in send buffer 304. More particularly, the starting memory location and ending memory location of send buffer 304 are determined. A determination is made that memory location 314 in not between the starting memory location and ending memory location of send buffer 304 and thus that master malicious call module 302MM is not in send buffer 304. Accordingly, flow moves to call module in executable area check operation 508.

In call module in executable area check operation 508, a determination is made that memory location 314 is not an executable area, e.g., is not in executable area 113 (FIG. 1), and flow moves to compare call module to send buffer operation 512. In compare call module to send buffer operation 512, master malicious call module 302MM is compared to the content of send buffer 304, e.g., for similarities.

Flow moves from compare call module to send buffer operation 512 to call module matches send buffer check operation 514. In call module matches send buffer check operation 514, a determination is made that master malicious call module 302MM does match the content of send buffer 304. More particularly, because malicious call module 302M is a copy of master malicious call module 302MM, master malicious call module 302MM matches malicious call module 302M. Accordingly, flow returns to known false positive check operation 218 via operation 506.

After a determination that master malicious call module 302MM is not a known false positive call module, hook module 312 terminates send OS function call 320 in terminate call operation 220. By terminating send OS function call 320, sending of the content of send buffer 304 including malicious call module 302M to another host computer system is prevented. Optionally, operations 222 and 224 are performed as discussed above and flow exits at exit operation 216 or returns to operation 206.

Below are some examples of malicious code blocked by send blocking application 106 in accordance with various embodiments of the present invention.

Slammer worm uses the WS2_32!sendto() API, i.e., a send OS function, to send itself to new UDP targets. The sendto() API receives a pointer to a buffer, i.e., the send buffer, located at 0x1050db73 in this example. The slammer worm sends 376 bytes. The stack trace function returns 0x1050dce9 for sendto()'s Caller's Address.

A determination is made that the slammer-worm, i.e., the call module, is in the send buffer in call module in send buffer check operation 504. This is because buf<=Caller's Address<(buf+376)

Using this formula: 0x1050db73<=0x1050dce9<0x1050dceb. In this example, the worm attempted to send itself to randomly generated IP address 186.63.210.15 on UDP port 1434 (SQL Server). In the next example, the IP address was 73.224.212.240 but the slammer worm was detected and blocked the same way.

Other examples of malicious code detected and blocked using send blocking application 106 are set forth below:

```
00000000 0.00000000 [768] blocked wormish sendto
   (1050db73,376) call from 1050dce9!

00000001 0.00049448 [768] ws2_32!sendto(1024, .
   . . < . . . >, 376, 0, 186.63.210.15:1434)

00000002 0.00082804 [768] blocked wormish sento
   (1050db73,376) call from 1050dce9!

00000003 0.00110433 [768] ws2_32!sendto(1024, . .
   . < . . . >, 376, 0, 73.224.212.240:1434)
```

Below is a log file about the CodeRed worm in action and blocked by send blocking application 106 in accordance with one embodiment:
00000005 158.50858782 [2624] ws2_32!send(4868, GET ,4, 0)
00000006 158.50870013 [2624] ws2_32!send(4868, /default.ida, 12, 0)
00000007 158.50879288 [2624] ws2_32!send(4868, ?, 1, 0)
00000008 158.50888535 [2624] ws2_32!send(4868, NNNNNNNNNNNNNNNNNNNN< . . . >, 362, 0)
00000009 158.50897670 [2624] ws2_32!send(4868, HTTP/1.0..Content-< . . . >, 91, 0)
00000010 158.50905939 [2624] ws2_32!send(4868, U.∞ü∞. . . SVW.ˡʲΦ²..ˌˡ|.< . . . >, 3569, 0)
00000011 158.50912113 [2624] blocked wormish send (0041d246, 3569) call from 0041dcae!

Referring again to FIG. 1, send blocking application 106 is in computer memory 114. As used herein, a computer memory refers to a volatile memory, a non-volatile memory, or a combination of the two.

Although send blocking application 106 is referred to as an application, this is illustrative only. Send blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, send blocking application 106 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, send blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one-embodiment, host-computer system 102 and/or server system 130 is a portable computer, a workstation, a two-way pager, a cellular telephone, a digital wireless telephone, a personal digital assistant, a server computer, an Internet appliance, or any other device that includes components that can execute the send blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the send blocking functionality in accordance with one embodiment of present invention can be implemented in a wide variety of computer system configurations. In addition, the send blocking functionality could be stored as different modules in memories of different devices. For example, send blocking application 106 could initially be stored in server system 130, and then as necessary, a portion of send blocking application 106 could be transferred to host computer system 102 and executed on host computer system 102. Consequently, part of the send blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, send blocking application 106 is stored in memory 136 of server system 130. Send blocking application 106 is transferred over network 124 to memory 114 in host computer system 102. In this embodiment, network interface 138 and I/O interface 110 would include analog modems, digital modems, or a network interface card. If modems are used, network 124 includes a communications network, and send blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    stalling a call originating from a call module to a send operating system (OS) function to send the content of a send buffer;
    determining a location of said call module; and
    determining whether code of said call module is in said send buffer comprising:
        determining a starting memory location of said send buffer;
        determining an ending memory location of said send buffer; and
        determining whether said location of said call module is between said starting memory location and said ending memory location,
    wherein upon a determination that said location of said call module is not between said starting memory location and said ending memory location, said determining whether code of said call module is in said send buffer further comprises:
        comparing said call module to content of said send buffer; and
        determining whether said call module matches said content of said send buffer,
    wherein upon a determination that said location of said call module does match said content of said send buffer, a determination is made that said code of said call module is in said send buffer,
    wherein upon a determination that said code of said call module is in said send buffer during said determining, said method further comprising terminating said call.

2. The method of claim 1 wherein upon a determination that said code of said call module is not in said send buffer during said determining, said method further comprising allowing said call to proceed.

3. The method of claim 1 further comprising hooking said send OS function.

4. The method of claim 1 further comprising originating said call from said call module.

5. The method of claim 1 wherein upon a determination that said location of said call module is not between said starting memory location and said ending memory location, said determining whether code of said call module is in said send buffer further comprises:
    determining whether said call module is in an executable area.

6. The method of claim 1 further comprising determining whether said call module is a known false positive call module prior to said terminating said call.

7. The method of claim 1 further comprising taking protective action to prevent damage to a host computer system comprising said call module.

8. The method of claim 1 further comprising providing a notification that said call was terminated during said terminating.

9. The method of claim 1 wherein said call module comprises malicious code, said method further comprising submitting a sample of said malicious code to a virus collection center.

10. The method of claim 1 further comprising identifying said send buffer by said starting memory location of said send buffer and a length of data to be sent from said send buffer.

11. A method comprising:
    stalling a call originating from a call module to a send operating system (OS) function to send the content of a send buffer;
    determining a location of said call module; and
    determining whether code of said call module is in said send buffer comprising:
        determining a starting memory location of said send buffer;
        determining an ending memory location of said send buffer;
        and
        determining whether said location of said call module is between said starting memory location and said ending memory location, wherein upon a determination that said location of said call module is not between said starting memory location and said ending memory location, said determining whether code of said call module is in said send buffer further comprises:
    comparing said call module to content of said send buffer; and
    determining whether said call module matches said content of said send buffer, wherein upon a determination that said call module does match said content of said send buffer, a determination is made that said code of said call module is in said send buffer;
    wherein upon a determination that said code of said call module is in said send buffer during said determining, said method further comprising determining whether said call module is a known false positive call module; and
    wherein upon a determination that said code of said call module is not in said send buffer during said determining, said method further comprising allowing said call to proceed.

12. The method of claim 11 wherein upon a determination that said call module is a known false positive call module, said method further comprising allowing said call to proceed.

13. The method of claim 11 wherein upon a determination that said call module is not a known false positive call module, said method further comprising terminating said call.

14. The method of claim 11 further comprising identifying said send buffer by said starting memory location of said send buffer and a length of data to be sent from said send buffer.

15. A computer system comprising:
    a send blocking application for stalling a call originating from a call module to a send operating system (OS) function to send the content of a send buffer;
    said send blocking application further for determining a location of said call module; and said send blocking application further for determining whether code of said call module is in said send buffer comprising:

determining a starting memory location of said send buffer;

determining an ending memory location of said send buffer; and determining whether said location of said call module is between said starting memory location and said ending memory location, wherein upon a determination that said location of said call module is not between said starting memory location and said ending memory location, said determining whether code of said call module is in said send buffer further comprises:

comparing said call module to content of said send buffer; and determining whether said call module matches said content of said send buffer, wherein upon a determination that said call module does match said content of said send buffer, a determination is made that said code of said call module is in said send buffer, wherein upon a determination that said code of said call module is in said send buffer during said determining, said send blocking application further for terminating said call.

16. The computer system of claim 15 wherein upon a determination that said location of said call module is not between said starting memory location and said ending memory location, said determining whether code of said call module is in said send buffer further comprises:

determining whether said call module is in an executable area.

17. The computer system of claim 15 wherein said determining whether code of said call module is in said send buffer comprises determining whether said call module or a copy of said call module is in said send buffer.

18. The computer system of claim 15 wherein said send buffer is identified by said starting memory location of said send buffer and a length of data to be sent from said send buffer.

* * * * *

UNITED STATES PATENT AND TRADEMARK OFFICE
CERTIFICATE OF CORRECTION

PATENT NO. : 7,287,281 B1  Page 1 of 1
APPLICATION NO. : 10/464091
DATED : October 23, 2007
INVENTOR(S) : Peter Szor It is certified that error appears in the above-identified patent and that said Letters Patent is hereby corrected as shown below:

In Column 13, Line 42, Claim 1, delete "said location of".

Signed and Sealed this

Twenty-eighth Day of October, 2008

JON W. DUDAS
*Director of the United States Patent and Trademark Office*